United States Patent Office 3,528,779
Patented Sept. 15, 1970

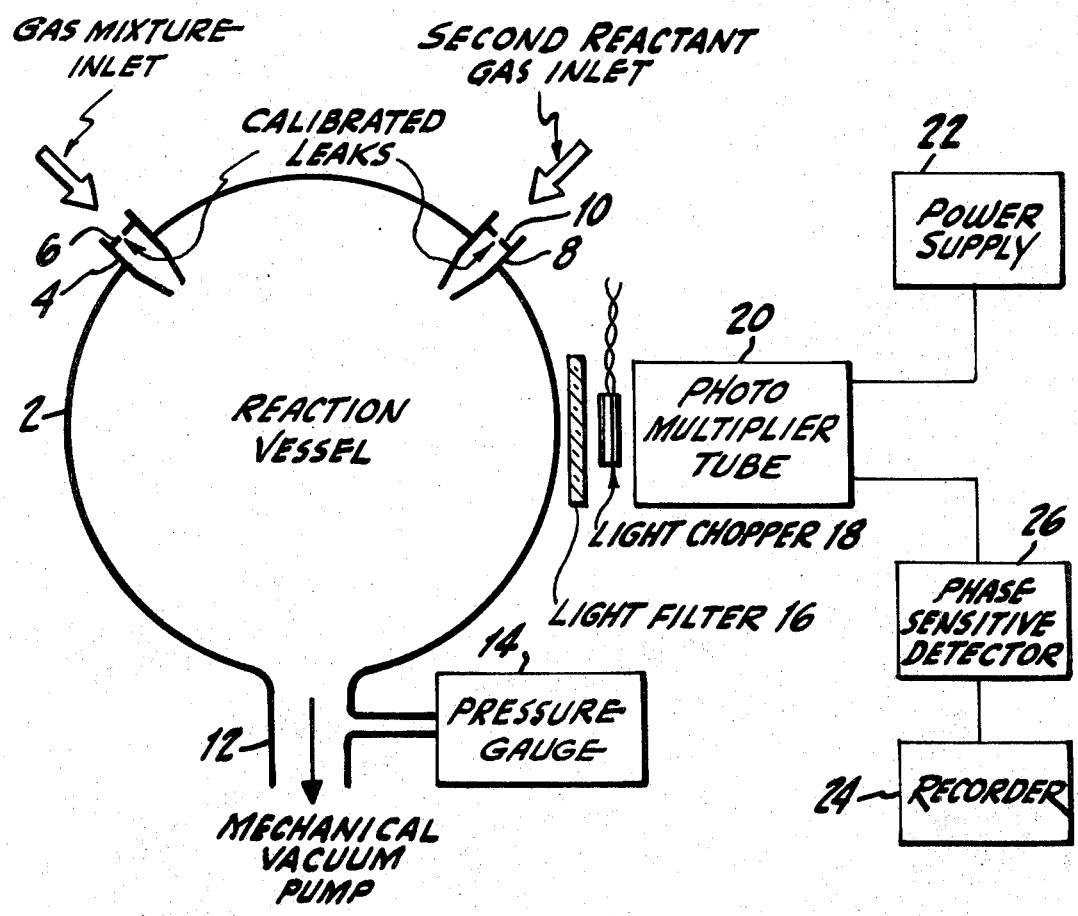

3,528,779
CHEMILUMINESCENT METHOD OF DETECTING OZONE
Arthur Fontijn, Princeton, N.J., assignor to AeroChem Research Laboratories, Inc., a corporation of Maryland
Filed June 27, 1968, Ser. No. 740,758
Int. Cl. G01n 21/22
U.S. Cl. 23—232                        4 Claims

ABSTRACT OF THE DISCLOSURE

A continuous flow method of measuring the concentration of ozone in a mixture of gases, such as the atmosphere, comprising introducing into a reaction chamber being maintained at a reduced pressure, a quantity of the gas mixture at a constant flow rate, and a quantity of nitric oxide, also at a constant flow rate, thereby producing chemiluminescence proportional in intensity to the ozone concentration, detecting the luminescence with a photomultiplier tube, and measuring the electrical signal produced.

BACKGROUND OF THE INVENTION

The study and control of air polution has generated a need for improved methods of monitoring the atmosphere under widely varying environmental conditions in order to continuously detect and accurately measure the concentrations of certain harmful impurities often found in the atmosphere. Although there are known methods for detecting and measuring some of these impurities, no satisfactory method has been known for certain others.

One of the impurities for which there is no previously known entirely satisfactory method of analysis is ozone. A previously-known method of detecting and measuring this substance involves reaction with an oxidizable material such as potassium iodine to liberate iodine. But this method is relatively slow, indirect, and subject to a rather large percentage of error. Furthermore, it is a relatively insensitive method and is not a method that can readily be carried out continuously.

Another previously-known method employs a chemiluminescent reaction in which the ozone is reacted with a solid disc of the dye rhodamine-B. The light output of the heterogeneous luminescence reaction is a measure of the ozone concentration in the gas sample. The method is not well adapted to continuous monitoring since the sensitivity of the discs decreases with aging.

Another previously-known detecting method is a method based on reaction of the ozone with luminol to produce chemiluminescence. However, this method employs a liquid and is not as sensitive as sometimes desirable, nor adapted to continuous operation for long periods of time.

The monitoring of atmospheric pollution may require that a universal detection method be capable of operating at very low temperatures, or at the high temperatures often found below sea-level. Furthermore, the requirements may include ability of the method to operate for long periods with apparatus unattended.

Another drastic requirement for a method of detecting and measuring ozone in the atmosphere, if the equipment used is to operate under field conditions, is that it not require separation of the ozone from the other constituents of the atmosphere prior to measurement. This necessitates the qualification that no other substances usually found in the atmosphere will interfere with the ozone measurements.

A still further desirable attribute of a good ozone detection method is that it be linear in response over a broad range of concentrations, and sensitive down to the range of a few parts per billion.

OBJECTS OF THE INVENTION

One object of the present invention is to provide an improved method of measuring small concentrations of ozone in the atmosphere.

Another object of the invention is to provide an improved method of measuring ozone in the atmosphere which is useful over a wide range of temperature.

Another object of the invention is to provide a method of detecting and measuring ozone concentration in air without interference from oxygen or other atmospheric constituents.

A further objece of the invention is to provide an improved method of detecting and measuring ozone concentration in very small quantities in a gaseous mixture, said method being continuous and adaptable to automatic recording.

A still further object of the invention is to provide a very rapid method of detecting and measuring ozone concentration in the presence of other gases.

SUMMARY OF THE INVENTION

The present invention comprises a method of detecting and measuring the concentration of ozone in a mixture of gases. The method includes the steps of passing the mixture at a given flow rate through a reaction chamber maintained at a pressure of between about 0.1 and 1.0 torr, mixing nitric oxide (NO) at a predetermined flow rate with said mixture in said chamber, photoelectrically monitoring the intensity of light given off as a result of the reaction between the ozone in said mixture and said nitric oxide, and reading the value of an electrical signal produced by said photoelectric detecting step.

THE DRAWING

The single figure of the drawing is a schematic drawing of apparatus suitable for carrying out the method of the invention.

DESCRIPTION OF PREFERRED EMBODIMENT

Apparatus suitable for laboratory use in carrying out the methods of the invention is shown in the drawing. The apparatus includes a Pyrex glass spherical flask 2, which may have a volume of one liter. Sealed into the wall of the flask 2 is a first inlet tube 4 having a valve or calibrated leak 6. Sealed into another part of the flask wall is a second inlet tube 8 having a valve 10. Both of the inlet tubes 4 and 8 may be connected to flowmeters (not shown).

Also connected to the flask 2 is a relatively large outlet tube 12 leading to a mechanical vacuum pump (not shown). A pressure gauge 14 is connected to the outlet tube 12.

The flask may be packed in magnesium oxide powder (not shown) except for a window left free to transmit light through a light filter 16 and a light-chopper 18, which may be a rotating shutter or a vibrating slit, to a photomultiplier tube 20. The light-chopper may be set to operate at 140 cycles/sec.

A power supply 22 supplies operating power to the photomultiplier tube 20 and a recorder 24 is connected to the output of the tube.

Although it is not always necessary to use a light-chopper, when a chopper is used, it is also necessary to use a lock-in amplifier, or phase-sensitive detector 26 connected between the output of the photomultiplier tube 20 and the recorder 24. Suitable phase-sensitive detectors are commercially available, such as the HR–8 (Princeton Applied Research Co.). Other methods of increasing sensitivity may be used, such as pulse counting. If extreme sensitivity is not required, one may then use an electrometer, such as, for example a Keithley 602.

Added sensitivity may also be provided by cooling the photomultiplier tube to, say, about −40° C. A suitable cooling range is about −30° C. to about −60° C. Cooling the tube reduces background noise so that lower levels of signal may be detected and read. At a remote location, which is monitored only at intervals, the cooling may be carried out thermoelectrically by means well known in the art.

An embodiment of the method of the present invention may be carried out as follows:

The apparatus must first be calibrated. A zero reading on the recorder is first obtained using air which has been completely freed of ozone, and pure nitric oxide. The air may be admitted to the reaction vessel 2 through the valve 6 in the inlet tube 4. A preferred flow rate is one cc./sec. (at STP). The vacuum pump is turned on and the reaction vessel 2 is pump down to a reduced pressure of about 0.1 torr. Nitric oxide may be admitted to the vessel 2 through valve 10 in inlet tube 8. A preferred rate of flow for this gas is $1 \times 10^{-2}$ cc./sec. (at STP). Oxygen in the air reacts with nitric oxide at such a slow rate that it does not interfere in the present method. Therefore there should be no measurable luminescence to be detected at this stage.

Next, using the same flow rate as for the pure air, more air is admitted with the various known amounts of ozone added ranging between one part-per billion (p.p.b.) and $10^6$ p.p.b. With the added ozone, chemiluminescence is generated and the light intensity is linearly proportional to the ozone concentration. Readings are taken on the recorder 24 with each change in ozone concentration, and a calibration chart is made out.

The apparatus is now ready to measure ozone concentration in air having unknown concentrations of the contaminant. It is merely necessary to admit the air at the same flow rate as during the calibration proceedings and to maintain the flow rate of nitric oxide constant at the flow rate previously specified.

Sensitivity of the method may be increased by raising the temperature of the reaction flask to 400° C. At this temperature the efficiency of the luminescence reaction is increased by about a factor of 20 over operation at 20° C.

The method may be further refined using light filter 16, using a filter that cuts off all light below about 6000–7000 A., or passes light only between 7000 and 9000 A.

One of the important advantages of the present method is that it is a continuous flow, homogeneous chemiluminescent detection method rather than a method which depends upon a heterogeneous phase reaction.

Under favorable operating conditions and using a light chopper and phase-sensitive detector and also cooling the photomultiplier tube, ozone can be detected in concentrations as low as one p.p.b. This is, in fact, at least as good as any method presently known, with the added advantage that the method is relatively simple and is also continuous.

The method may also be used to measure ozone concentration in mixtures of gases other than air if suitable filters are used to keep unwanted wavelengths of light that may be generated from interfering substances, from reaching the photomultiplier tube.

I claim:
1. A method of detecting the presence of and measuring the concentration of ozone in a mixture of gases comprising:
   (a) passing said gas mixture at a given flow rate through a reaction chamber which is maintained at a pressure of between about 0.1 and 1.0 torr,
   (b) mixing nitric oxide at a predetermined flow rate with said mixture in said chamber,
   (c) photoelectrically detecting the intensity of light given off as a result of the chemiluminescent reaction between said ozone in said mixture and said nitric oxide, and
   (d) reading the value of an electrical signal produced as a result of said photoelectric detecting step.

2. A method according to claim 1 in which said mixture of gases is air.

3. A method according to claim 2 in which said reaction chamber has a volume of one liter, the flow rate of said air is maintained at about one cc./sec., and the flow rate of said nitric oxide is maintained at a rate of about $1 \times 10^{-2}$ cc./sec., both said flow rates being measured at STP.

4. A method according to claim 1 in which the light generated within said reaction chamber is detected photoelectrically using phase-sensitive detecting means.

References Cited
UNITED STATES PATENTS

| | | | |
|---|---|---|---|
| 3,271,113 | 9/1966 | Van Pul | 23—232 X |
| 3,285,703 | 11/1966 | Narita et al. | 23—254 |
| 3,370,175 | 2/1968 | Jordon et al. | 250—217 |

WALTER STOLWEIN, Primary Examiner

U.S. Cl. X.R.

23—254, 255; 250—217; 73—23